(12) United States Patent
Blaut et al.

(10) Patent No.: US 9,780,955 B2
(45) Date of Patent: Oct. 3, 2017

(54) POWER OVER ETHERNET METHOD AND APPARATUS FOR IMMEDIATE POWER AVAILABILITY

(71) Applicant: Microsemi P.O.E Ltd., Hod Hasharon (IL)

(72) Inventors: Roni Blaut, Kfar Haroeh (IL); Alon Ferentz, Petach Tikva (IL)

(73) Assignee: Microsemi P.O.E Ltd., Hod Hasharon (IL)

( * ) Notice: Subject to any disclaimer, the term of this patent is extended or adjusted under 35 U.S.C. 154(b) by 280 days.

(21) Appl. No.: 14/736,283

(22) Filed: Jun. 11, 2015

(65) Prior Publication Data

US 2015/0372826 A1    Dec. 24, 2015

Related U.S. Application Data

(60) Provisional application No. 62/014,167, filed on Jun. 19, 2014, provisional application No. 62/014,169, filed on Jun. 19, 2014.

(51) Int. Cl.
*H04L 12/10* (2006.01)

(52) U.S. Cl.
CPC .................................. *H04L 12/10* (2013.01)

(58) Field of Classification Search
USPC .......................................................... 307/1
See application file for complete search history.

(56) References Cited

U.S. PATENT DOCUMENTS

| | | | |
|---|---|---|---|
| 7,849,343 B2 | 12/2010 | Ferentz et al. | |
| 2008/0024106 A1* | 1/2008 | Landry | H04L 12/10 323/316 |
| 2008/0062586 A1* | 3/2008 | Apfel | H04L 12/10 361/18 |
| 2008/0238656 A1* | 10/2008 | de la Torre Vega | H04L 12/10 340/538.16 |

(Continued)

OTHER PUBLICATIONS

IEEE Computer Society; "IEEE std 802.af-2003"; pp. 29-57, 94-96, 102, 115; published Jun. 18, 2003; The Institute of Electrical and Electronic Engineers, Inc., New York, NY, 2003.

(Continued)

*Primary Examiner* — Jared Fureman
*Assistant Examiner* — Joel Barnett
(74) *Attorney, Agent, or Firm* — Simon Kahn

(57) ABSTRACT

A PSE control circuitry arranged to: control the power source to output a detection signal; responsive to the detection signal, determine the resistance of a signature resistive element; in the event that the determined resistance is within a predetermined range, control a power source to output power to the load; in the event that the determined resistance is outside the predetermined range, prevent the power source from outputting power for a predetermined disconnect time period; detect the amount of power drawn from the power source; in the event that the detected power amount is less than a predetermined minimum power draw value, control the power source to cease output of power for a predetermined power down time period, the predetermined power down time period less than the predetermined disconnect time period; immediately subsequent to both time periods, control the power source to output the detection signal.

15 Claims, 8 Drawing Sheets

(56) References Cited

U.S. PATENT DOCUMENTS

2012/0011380 A1* 1/2012 Dove ..................... H04L 12/10
                                                                  713/300
2015/0042243 A1* 2/2015 Picard ................ H05B 37/0272
                                                                  315/307

OTHER PUBLICATIONS

IEEE Computer Society; "IEEE std 802.at-2009"; pp. 22-67; published Oct. 30, 2009; The Institute of Electrical and Electronic Engineers, Inc., New York, NY, 2003.

* cited by examiner

POWER OVER ETHERNET METHOD AND APPARATUS FOR IMMEDIATE POWER AVAILABILITY

TECHNICAL FIELD

The invention relates generally to the field of power over Ethernet (PoE), and in particular to a rapid start-up PoE system and method.

BACKGROUND

Power over Ethernet (PoE), in accordance with both IEEE 802.3af-2003 and IEEE 802.3at-2009, each published by the Institute of Electrical and Electronics Engineers, Inc., New York, the entire contents of each of which is incorporated herein by reference, defines delivery of power over a set of 2 twisted wire pairs without disturbing data communication. The aforementioned standards particularly provide for a power sourcing equipment (PSE) and a powered device (PD).

When a PD no longer draws power from the PSE, defined by the above mentioned standard as the lack of a maintain power signature (MPS), the PSE shuts down within a predetermined time period and periodically performs a detection stage to detect if a valid PD is connected to the PSE. In the event that a valid PD is detected, the PSE is arranged to supply power to the PD, optionally after performing a classification stage to determine the class of the PD. For some applications, such as lighting, the period between successive detection stages is longer than a user is willing to wait for. As a solution, the PD may be arranged to continuously draw a predetermined minimum amount of power from the PSE so as to maintain the MPS. In order to keep the PSE from shutting down, a direct current (DC) DC MPS is defined in the IEEE 802.3af-2003 standard as sinking at least 10 mA for a minimum duration of 75 ms followed by a dropout period of no more than 250 ms. Unfortunately, this constitutes a significant amount of wasted power, approximately 150 mW. In particular, any control electronics, e.g. a remote control switch, motion detectors, ambient light sensors and network cards, do not need such large amounts of power, thereby most of it is wasted. In the absence of an MPS, a command to energize a PoE based PD will not be actively responded until the next detection, optional classification, and powering cycle occurs. Such a cycle is typically performed every 1-2 seconds, which is not acceptable for lighting. Furthermore, power for any remote control receiving apparatus is not available from the PSE, unless the MPS is maintained.

There is thus a long felt need for a PoE system which can provide rapid turn on of a PD without drawing a large MPS.

SUMMARY OF THE INVENTION

Accordingly, it is a principal object of the present invention to overcome the disadvantages of prior art PoE systems. This is accomplished in certain embodiments by a rapid start-up power over Ethernet (PoE) system comprising: a power sourcing equipment (PSE); and a powered device (PD). The PD comprises: a PD interface comprising a first signature resistive element; a power converter; and a load in electrical communication with a power output of the power converter. The PSE comprises: a power source in electrical communication with the first signature resistive element and with a power input of the power converter, the power source arranged to provide power to the load via the power converter and to provide power to the first signature resistive element; and a PSE control circuitry in communication with the first signature resistive element.

The PSE control circuitry is arranged to: control the power source to output a detection signal exhibiting a first predetermined voltage; responsive to the output detection signal, determine the resistance of the first signature resistive element; in the event that the determined resistance of the first signature resistive element is within a predetermined range, control the power source to output power to the load, the output power exhibiting a second predetermined voltage, greater than the first predetermined voltage; in the event that the determined resistance of the first signature resistive element is outside the predetermined range, prevent the power source from outputting power for a predetermined disconnect time period; detect the amount of power drawn from the power source; in the event that the detected power amount is less than a predetermined minimum power draw value, control the power source to cease output of power for a predetermined power down time period, the predetermined power down time period less than the predetermined disconnect time period; immediately subsequent to the predetermined power down time period, control the power source to output the detection signal; and immediately subsequent to the predetermined disconnect time period, control the power source to output the detection signal.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

Figure 1A:
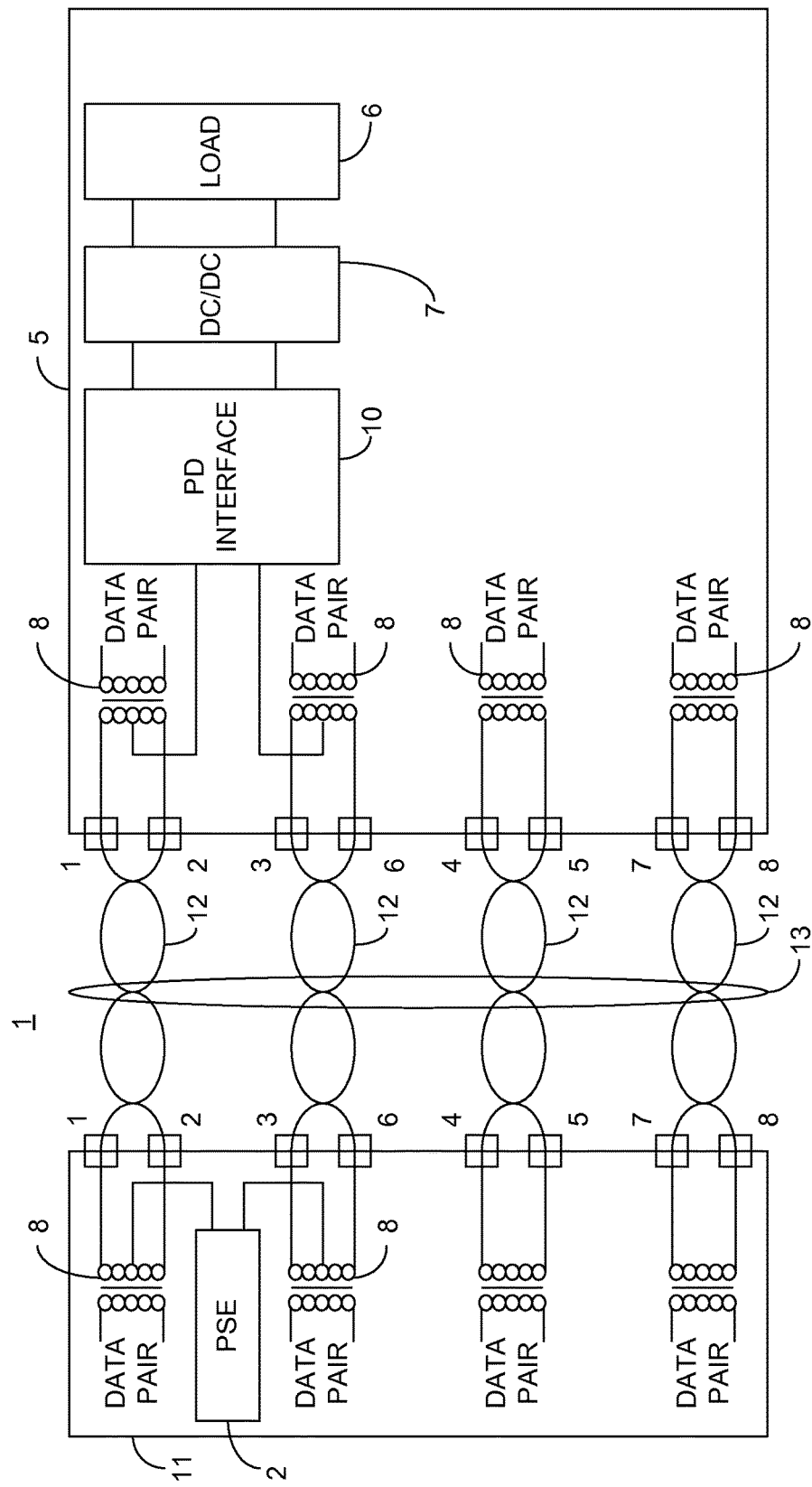
FIGS. 1A-1B illustrate a high level schematic diagram of a PoE system comprising a PSE and a PD, wherein a signature resistive element of the PD is isolated from an input capacitance element by a unidirectional electronic valve, according to certain embodiments.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. The term resistor as used herein refers to an element defined in an integrated circuit arranged to present resistance to a current flow there through.

FIG. 1A illustrates a high level schematic diagram of a PoE system 1 comprising: a switch/hub 11; a plurality of twisted pairs 12 constituted within a structured cable 13; and a PD 5, comprising a load 6, a DC/DC power converter 7, a plurality of data transformers 8 and a PD interface 10. Switch/hub 11 comprises a plurality of data transformers 8 and a PSE 2. A data pair is coupled across the primary of each data transformer 8 in switch/hub 11 and a first end of each twisted pair 12 is coupled across the secondary of each data transformer 8 in switch/hub 11 via respective connections, listed conventionally in two groups: connections 1, 2, 3, 6; and connections 4, 5, 7 and 8. The outputs of PSE 2 are respectively connected to the center taps of the secondary windings of data transformers 8 of switch/hub 11 connected to twisted pairs 12 via connections 1, 2, 3 and 6. Structured cable 13 typically comprises 4 twisted pairs 12.

A data pair is connected across the primary of each data transformer 8 in PD 5 and a second end of each twisted pair 12 is connected across the secondary of each data transformer 8 in PD 5 via respective connections, listed conventionally in two groups: connections 1, 2, 3, 6; and connections 4, 5, 7 and 8. The inputs of PD interface 10 are respectively connected to the center taps of the secondary windings of data transformers 8 of PD 5 connected to twisted pairs 12 via connections 1, 2, 3 and 6. Load 6 is coupled to PD interface 10 via DC/DC power converter 7, as described below in relation to FIG. 1B.

The above has been illustrated in an embodiment wherein a single PSE 2 is arranged to provide power over two twisted pairs 12, however this is not meant to be limiting in any way. In another embodiment, switch/hub 11 comprises a pair of PSEs 2, each arranged to provide power over a respective pair of twisted pairs 12. Similarly, PSE 2 is illustrated as being part of switch/hub 20 however this is not meant to be limiting in any way, and midspan equipment may be utilized to provide a connection for PSE 2 without exceeding the scope. PSE 2 may be any equipment arranged to provide power over communication cabling, including equipment meeting the definition of a PSE under any of IEEE 802.3af and IEEE 802.3at, without limitation.

Figure 1B:
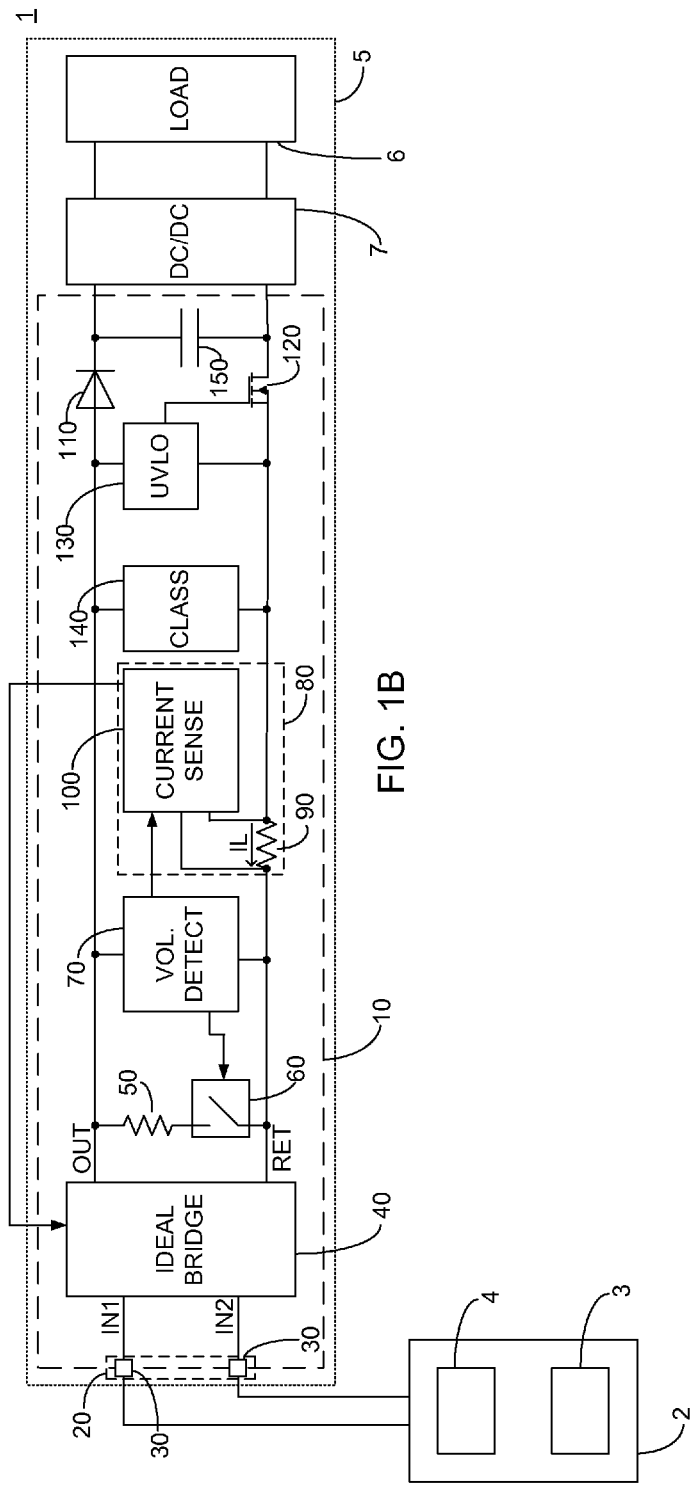

FIG. 1B illustrates a high level schematic diagram of PoE system 1, with a more detailed illustration of PD interface 10. PD interface 10 comprises: a power reception port 20, comprising a pair of port nodes 30; an ideal diode bridge 40; a signature resistive element 50; an electronically controlled switch 60, denoted herein as "resistance switch 60" for brevity; a voltage detection circuitry 70; a current detection circuitry 80 comprising a resistor 90 and a current sense unit 100; a unidirectional electronic valve 110, denoted herein as "valve 110" for brevity; an isolation electronically controlled switch 120, denoted herein as "isolation switch 120" for brevity; an under voltage lock-out (UVLO) circuit 130; an optional class circuit 140; and an input capacitance element 150.

Figure 1C:
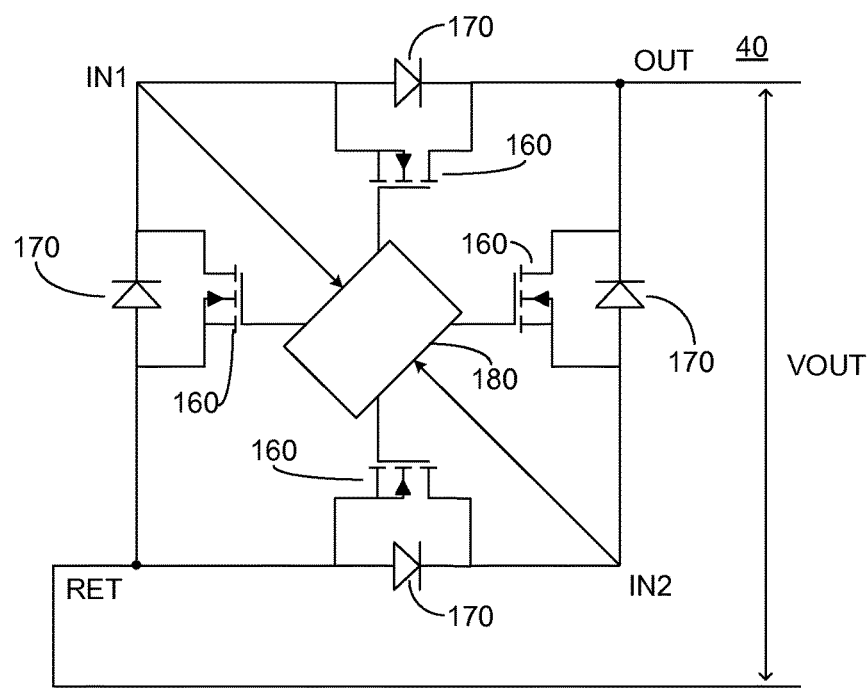
FIG. 1C illustrates a high level schematic diagram of an ideal diode bridge of the PoE system of FIGS. 1A-1B, according to certain embodiments.

FIG. 1C illustrates a high level schematic diagram of ideal diode bridge 40 of FIG. 1B, comprising: a plurality of electronically controlled switches 160, denoted herein as "diode switches 160" for brevity, each coupled in parallel to a respective one of a plurality of unidirectional electronic valves 170; and a diode bridge control circuitry 180.

Figure 1D:
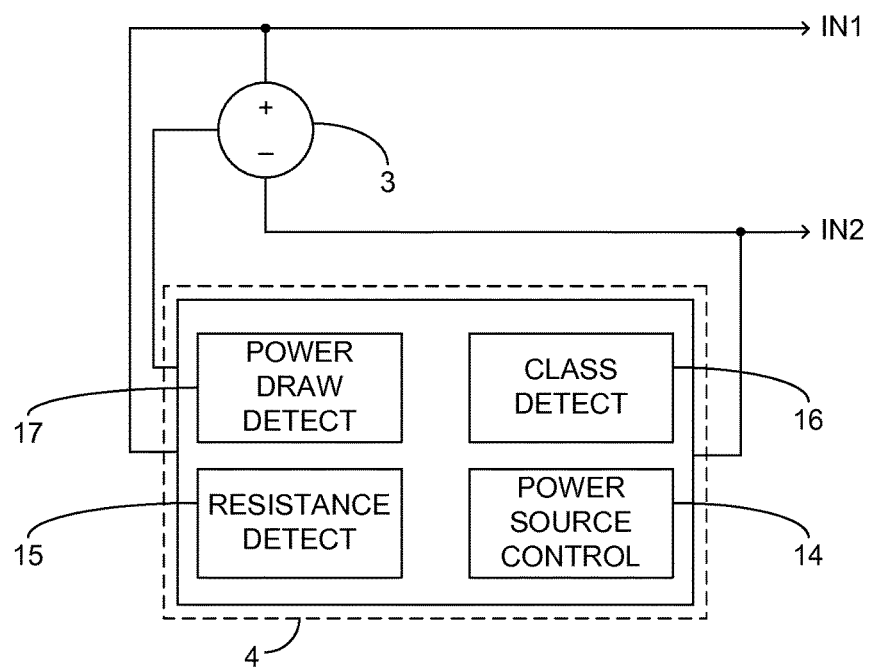
FIG. 1D illustrates a high level schematic diagram of the PSE of the PoE system of FIGS. 1A-1B, according to certain embodiments.

FIG. 1D illustrates a high level schematic diagram of PSE 2 of FIGS. 1A-1B, comprising: an adjustable power source 3; and a PSE control circuitry 4. PSE control circuitry 4 comprises: a power source control 14; a resistance detector 15;

an optional class detector 16; and a power draw detector 17. For clarity, the arrangement of FIGS. 1A-1D will be described together.

PoE system 1 is described herein as comprising an ideal diode bridge 40, however this is not meant to be limiting in any way and any type of bridge circuit which results in polarity insensitivity may be utilized without exceeding the scope. In one embodiment, signature resistive element 50 comprises a resistor exhibiting a resistance of 26.5 kΩ. In another embodiment, valve 110 comprises a diode and is described herein as such for simplicity. In another embodiment, isolation switch 120 comprises an n-channel metal-oxide-semiconductor field-effect transistor (NMOSFET), and is described herein as such for simplicity. In one embodiment, input capacitance element 150 comprises a capacitor. In another embodiment, each diode switch 160 comprises an NMOSFET and is described herein as such for simplicity, and the respective unidirectional electronic valve 170 of each diode switch 160 is in one embodiment implemented by the body diode thereof and is denoted herein "body diode 170" for simplicity.

Each input of ideal diode bridge 40 is coupled to a center tap of a respective data transformer 8 of PD 5 via a respective port node 30 of power reception port 20. A first input of ideal diode bridge 40, denoted "IN1", is coupled to: a first input of diode bridge control circuitry 180; the source of a first diode switch 160 and the anode of body diode 170 thereof; and the drain of a second diode switch 160 and the cathode of body diode 170 thereof. A second input of ideal diode bridge 40, denoted "IN2", is coupled to: a second input of diode bridge control circuitry 180; the source of a third diode switch 160 and the anode of body diode 170 thereof; and the drain of a fourth diode switch 160 and the cathode of body diode 170 thereof.

The output of ideal diode bridge 40, denoted "OUT", is coupled to: the drain of first diode switch 160 and the cathode of body diode 170 thereof; and the drain of third diode switch 160 and the cathode of body diode 170 thereof. The return of ideal diode bridge 40, denoted "RET", is coupled to: the source of second diode switch 160 and the anode of body diode 170 thereof; and the source of fourth diode switch 160 and the anode of body diode 170 thereof. A respective output of diode bridge control circuitry 180 is coupled to the gate of each diode switch 160.

Output OUT of ideal diode bridge 40 is further coupled to a first end of signature resistive element 50, a first input of voltage detection circuitry 70, a first input of UVLO circuit 130, an input of optional class circuit 140 and the anode of valve 110. The cathode of valve 110 is coupled to a first end of input capacitance element 150 and a power input of DC/DC converter 7. A power output of DC/DC converter 7 is coupled to the input of load 6. The return of load 6 is coupled to a return input of DC/DC converter 7. A return output of DC/DC converter 7 is coupled to the second end of input capacitance element 150 and the drain of isolation switch 120. The gate of isolation switch 120 is coupled to an output of UVLO circuit 130. The source of isolation switch 120 is coupled to a second input of UVLO circuit 130, an output of optional class circuit 140, a first end of resistor 90 and a first input of current sense unit 100 of current detection circuitry 80. A second end of resistor 90 is coupled to a second input of current sense unit 100, a second input of voltage detection circuitry 70, a first terminal of resistance switch 60 and return RET of ideal diode bridge 40. The second terminal of resistance switch 60 is coupled to the second end of signature resistive element 50 and the control input of resistance switch 60 is in communication with a respective output of voltage detection circuitry 70. An enabling input of current sense unit 100 is in communication with a respective output of voltage detection circuitry 70 and an output of current sense unit 100 is in communication with an enabling input of ideal diode bridge 40, in particular with an enabling input of diode bridge control circuitry 180 (connection not shown).

Each of a pair of inputs IN1, IN2 is coupled to a respective one of the power terminal and the return of adjustable power source 3. An output of PSE control circuitry 4 is coupled to a voltage adjustment input of adjustable power source 3.

Figure 1E:
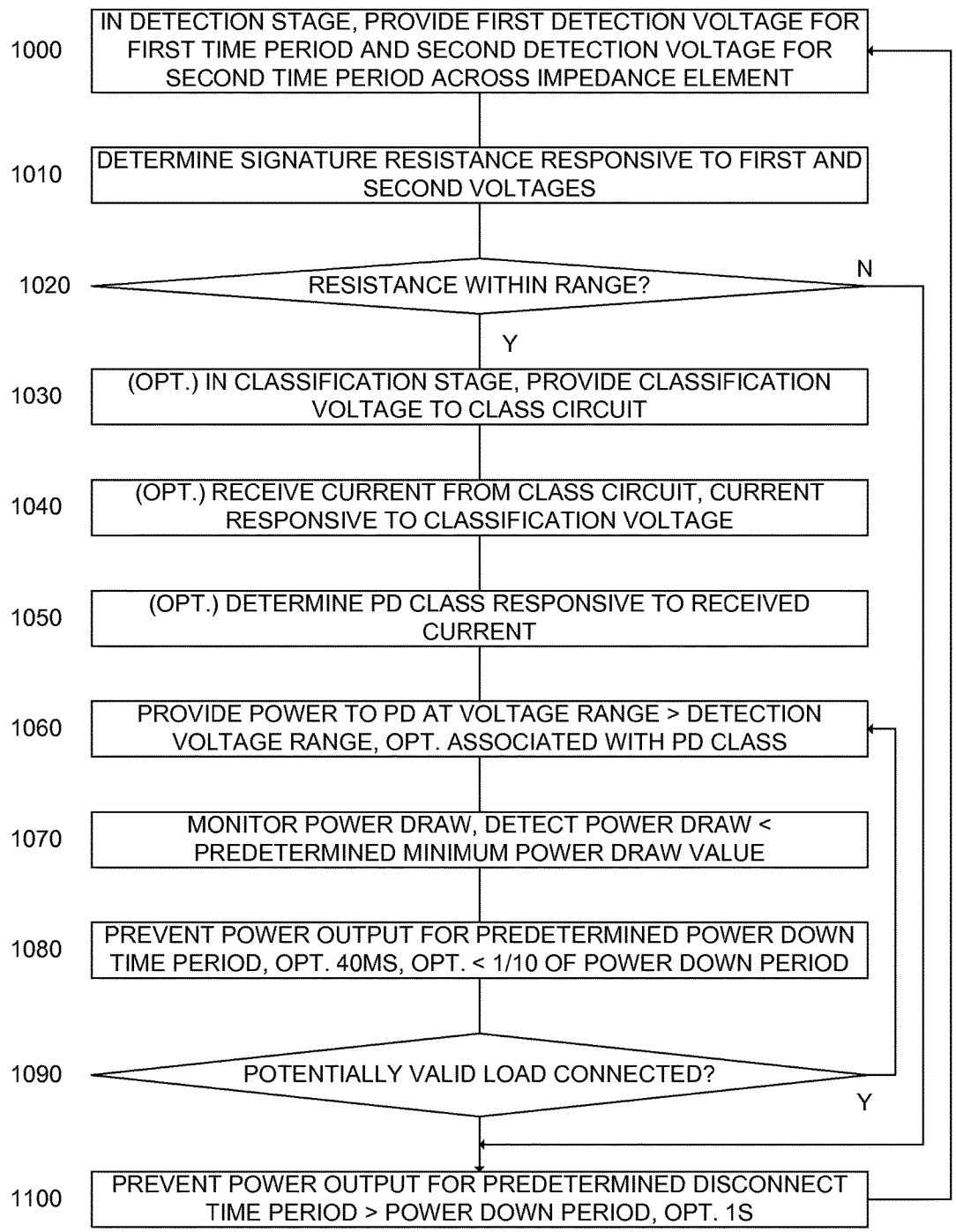
FIG. 1E illustrates a high level flow chart of a method of operation of the PSE of FIG. 1A, according to certain embodiments.

FIG. 1E illustrates a high level flow chart of a method of operation of PSE 2, the operation of PD interface 10 and PSE 2 being described together. In operation, in stage 1000, a detection stage is implemented. In the detection stage, power source control 14 is arranged to control adjustable power source 3 to output a first detection signal, exhibiting a first voltage value, for a first time period and a second detection signal, exhibiting a second voltage value, for a second time period, in accordance with the standards described above. The first and second voltage values are in the range of 2.8-10V, with a difference of at least 1V between the first voltage and the second voltage. The second time period begins at least 2 ms after the end of the first time period and the overall period from the beginning of the first time period to the end of the second time period is less than 500 ms.

Voltage detection circuitry 70 is arranged to detect the potential difference between output OUT and return RET of ideal diode bridge 40, denoted VOUT, and enable/disable resistance switch 60 and current sense unit 100 responsive thereto. In particular, in the event that VOUT is less than a predetermined minimum detection stage voltage value, optionally 12V, voltage detection circuit 70 is arranged to close resistance switch 60, thus presenting signature resistive element 50 to PSE control circuitry 4 via ideal diode bridge 40. In one embodiment, resistance switch 60 is arranged to be normally closed in the absence of an active signal from voltage detection circuit 70. As will be described below in relation to stage 1060, voltage detection circuitry 70 is further arranged to enable current sense unit 100 when VOUT is greater than a predetermined minimum power stage voltage value.

In stage 1010, resistance detector 15 is arranged to determine the signature resistance of PD interface 10, i.e. determine the resistance of signature resistive element 50, responsive to the output voltages of stage 1000. In particular, as described above, PSE 2 is in electrical communication with signature resistive element 50 via ideal diode bridge 40, responsive to resistance switch 60 being closed during the detection stage. Thus, PSE control circuitry 4 is able to determine the resistance of signature resistive element 50 responsive to the applied first and second voltages, as known to those skilled in the art at the time of the invention.

Valve 110 isolates input capacitance element 150 from signature resistive element 50, therefore charge stored on input capacitance element 150 is prevented from being transferred to signature resistive element 50 and therefore does not impact the resistance detection by PSE control circuitry 4. In particular, without the isolation of valve 110 the detection signals of stage 1000 would be affected by the charge stored on input capacitance element 150, since PSE control circuitry 4 would be determining the resistance of signature resistive element 50 responsive to a detection signal which has been altered by the charge of input capacitance element 150 and would therefore make an incorrect resistance determination. Valve 110, however, is arranged to block potential difference across capacitance element 150 from being seen across signature resistive element 50. Valve 160 thus enables the detection of stage 1010 may be performed after only a short time period following powering down of PD 5, irrespective of charge held across capacitance element 150, as will be described further below in relation to stage 1080.

Additionally, UVLO circuit 130 is arranged to maintain isolation switch 120 open as long as voltage VOUT is less than a predetermined minimum operating voltage value, optionally 30-35V. The first and second detection signals of stage 1000 each exhibit a voltage less than the predetermined minimum operating voltage value, therefore isolating switch 120 is open during the detection stage and input capacitance element 150 is isolated from PSE 2. As described above in relation to signature resistive element 50, valve 110 isolates UVLO circuit 130 from input capacitance element 150 such that UVLO circuit 130 reads the voltage output by PSE 2 and not the potential difference across input capacitance element 150.

In stage 1020, power source control 14 is arranged to compare the determined signature resistance of stage 1010 with a predetermined resistance range, in accordance with the standards described above. In one embodiment, the predetermined resistance range is 19-26.5 kΩ. In another embodiment, the lower boundary of the predetermined resistance range is 15-19 kΩ and the upper boundary of the predetermined resistance ranged is 26.5-33 kΩ. In the event that the determined signature resistance is within the predetermined resistance range, it is determined that a valid PD 5 is coupled to twisted pairs 12 and power can be provided thereto.

In optional stage 1030, a classification stage is implemented. In the classification stage, power source control 14 is arranged to control adjustable power source 3 to output a classification signal to optional class circuit 140, the classification signal exhibiting a voltage greater than the voltage of the first and second detection signals of stage 1000, optionally 15.5-20.5V. Optional class circuit 140 outputs a predetermined current to PSE 2 indicating the class of PD 5, in accordance with the standards described above. In optional stage 1040, optional class detector 16 is arranged to receive the current output by optional class circuit 140 and in optional stage 1050 is arranged to determine the class of PD 5 responsive to the received current. Advantageously, valve 110 isolates optional class circuit 140 from input capacitance element 150, therefore charge stored on input capacitance element 150 does not impact the voltage received by optional class circuit 140, as described above in relation to the isolation of signature resistive element 50.

In stage 1060, power source control 14 is arranged to control adjustable power source 3 to provide DC power to load 6 via DC-DC converter 7. The voltage of power stage 1060 is within a range greater than the voltage range of the detection of stage 1010 and the classification of optional stage 1030, optionally the voltage of power stage 106 is 44-57V. Voltage detection circuitry 70 is arranged to enable the operation of current sense unit 100 responsive to voltage VOUT rising above a predetermined minimum operating voltage value, optionally 30-35V. Current sense unit 100 is arranged to sense the current flowing through resistor 90, the current denoted "IL". In the event that current sense unit 100 determines that the magnitude of current IL is greater than a predetermined value, i.e. that enough power is being provided to operate diode switches 160 of ideal diode bridge 40, current sense unit 100 enables the operation of diode bridge control circuitry 180. Such a current based control of ideal diode bridge 40 provides improved control over ideal diode bridge 40 as compared to prior art voltage based controls, and thus results in reduced power loss.

Diode bridge control circuitry 180 is arranged to compare the voltage potential at input IN1 to the voltage potential at input IN2. In the event that the voltage potential at input IN1 is greater than the voltage potential at input IN2 by a predetermined minimum amount, diode bridge control circuitry 180 is arranged to: close first diode switch 160 coupling input IN1 with output OUT; close fourth diode switch 160 coupling input IN2 with return RET; and open second and third diode switches 160. As a result, the voltage potential at power OUT will be greater than the voltage potential at return RET. In the event that the voltage potential at input IN1 is less than the voltage potential at input IN2 by the predetermined minimum amount, diode bridge control circuitry 180 is arranged to: close second diode switch 160 coupling input IN1 with return RET; close third diode switch 160 coupling input IN2 with output OUT; and open first and fourth diode switches 160. As a result, the voltage potential at output OUT will be greater than the voltage potential at return RET. Diode switches 160, responsive to diode bridge control circuitry 180, thus operate in the same manner of a diode bridge, i.e. the polarity of output voltage VOUT is always the same, regardless of the polarity of the potential difference between inputs IN1 and IN2, with a substantially lower voltage drop than that of a conventional diode bridge.

In the event that PD 5 is switched off or disconnected, i.e. load 6 no longer draws power from adjustable power source 3 of PSE 2, power control 14 is arranged to shut down adjustable power source 3 for one of a first and second predetermined time period. Particularly, in stage 1070, power draw detector 17 monitors the power being drawn from adjustable power source 3, and power draw detector 17 determines if the power being drawn from adjustable power source 3 is less than a predetermined minimum power draw value. In one embodiment, the predetermined minimum power draw value is power of less than 10 mA being drawn over a period of 300-400 ms, i.e. power draw detector 17 determines the absence of a valid MPS. In stage 1080, power source control 14 prevents adjustable power source 3 from outputting power for a predetermined power down time period. In one embodiment, the predetermined power down time period is about 40 ms.

After the predetermined power down time period of stage 1080 has elapsed, detection of stage 1090 is immediately performed. Detection of stage 1090 may be identical to the detection of stages 1010-1020, or alternatively pre-detection as described in U.S. Pat. No. 7,849,343 issued to Ferentz et al Dec. 7, 2010, the entire contents of which is incorporated herein by reference, is performed. In another embodiment any detection method that identifies that an open circuit does not appear across PSE 2 may be performed, since the detection of stage 1010 was valid and only an invalid MPS has been detected in stage 1070. In the event that a potentially valid load is detected, stage 1060 as described is performed, preferably immediately to provide power to the PD. Advantageously, in the event that during the power down time period PD 5 was switched back on, start-up of PD 5 will begin quickly because the power down time period is very short.

In the event that in stage 1090 a resistance is detected which is not indicative of a potentially valid load, for example it is indicative of an open circuit condition, or in the event that detection as in stages 1010-1020 is performed, the resistance is outside the acceptable range, in stage 1100 power source control 14 prevents adjustable power source 3 from outputting power for a predetermined disconnect time period, the predetermined disconnect time period significantly longer than the power down time period of stage 1080. In one embodiment, the predetermined disconnect time period is about 1 s. After the predetermined disconnect time period has elapsed, the detection of stage 1000 is again performed. Thus, in the event that a potentially valid load is not detected in stage 1090 the longer disconnect time period is utilized to time the subsequent detection, whereas in the event of an invalid MPS the shorter power time period is utilized to time the subsequent detection. The power down time period of stage 1080 is thus less than $\frac{1}{10}$ the disconnect time period of stage 1100.

Figure 2:
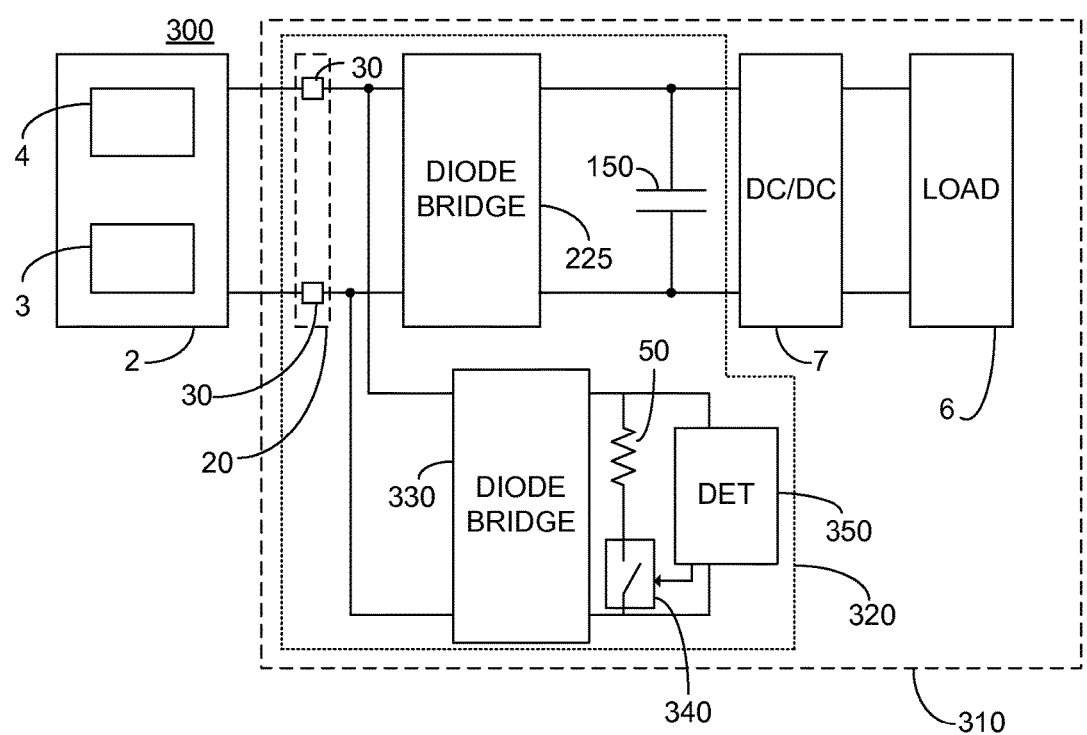
FIG. 2 illustrates a high level schematic diagram of a PoE system comprising a PSE and a PD, wherein a signature resistive element of the PD is isolated from an input capacitance element by an additional diode bridge, according to certain embodiments.

FIG. 2 illustrates a high level schematic diagram of a PoE system 300, comprising: a PSE 2 comprising aN adjustable power source 3 and a PSE control circuitry 4; and a PD 310 comprising a load 6, a DC-DC converter 7 and a PD interface 320. PD interface 320 comprises: a power reception port 20, comprising a pair of port nodes 30; a diode bridge 225; an input capacitance element 150; a diode bridge 330; a signature resistive element 50; an electronically controlled switch 340; and a detection control circuit 350.

Each input of diode bridge 225 is coupled to a respective output of PSE 2 via a respective port node 30 of power reception port 20, as described above in relation to PoE system 1 of FIG. 1A. The output of diode bridge 225 is coupled to a first end of input capacitance element 150 and to a power input of DC/DC converter 7. A power output of DC/DC converter 7 is coupled to an input of load 6. A return of load 6 is coupled to a return input of DC/DC converter 7 and a return output of DC/DC converter 7 is coupled to a second end of input capacitance element 150 and the return of diode bridge 225. Each input of diode bridge 225 is further coupled to a respective input of diode bridge 330. The positive output of diode bridge 330 is coupled to a first end of signature resistive element 50 and to a first input of detection circuit 350. A second end of signature resistive element 50 is coupled to a first port of electronically controlled switch 340. The return of diode bridge 330 is coupled to a second port of electronically controlled switch 340 and to a second input of detection circuit 350. An output of detection circuit 350 is connected to the control input of electronically controlled switch 340.

In operation, PSE 2 operates in all respects as described above in relation to FIG. 1C. In particular, as described above in relation to stage 1010, PSE control circuitry 4 is arranged to detect the resistance of signature resistive element 50. In contrast with PoE system 1, where signature resistive element 50 is isolated from input capacitance element 150 by valve 110, in PoE system 300 signature resistive element 50 is isolated from input capacitance element 150 by diode bridge 225. Advantageously, the arrangement of PoE system 300 does not require valve 110 within the power line connecting diode bridge 225 and DC/DC converter 7, as is required in PoE system 1 of FIG. 1A, thereby avoiding power loss due to current flowing through valve 110.

PoE system 300 has been described and illustrated as not comprising optional class circuit 140, however this is not meant to be limiting in any way. In another embodiment, optional class circuit 140 is provided, as described above in relation to FIG. 1A, and the classification of stages 1030-1050 are performed, as described above. In the event that a class circuit is provided, in certain embodiments a memory is provided arranged to ensure that detection of the type of PSE 2, identified by class circuit 140, is remembered in the absence of power from PSE 2 and may be polled by a control device (not shown).

FIG. 2 has been described with diode bridge 330 and a single signature resistive element 50, however this is not meant to be limiting in any way. In another embodiment a half bridge circuit is provided with separate signature resistive elements for each path, without exceeding the scope.

Figure 3:
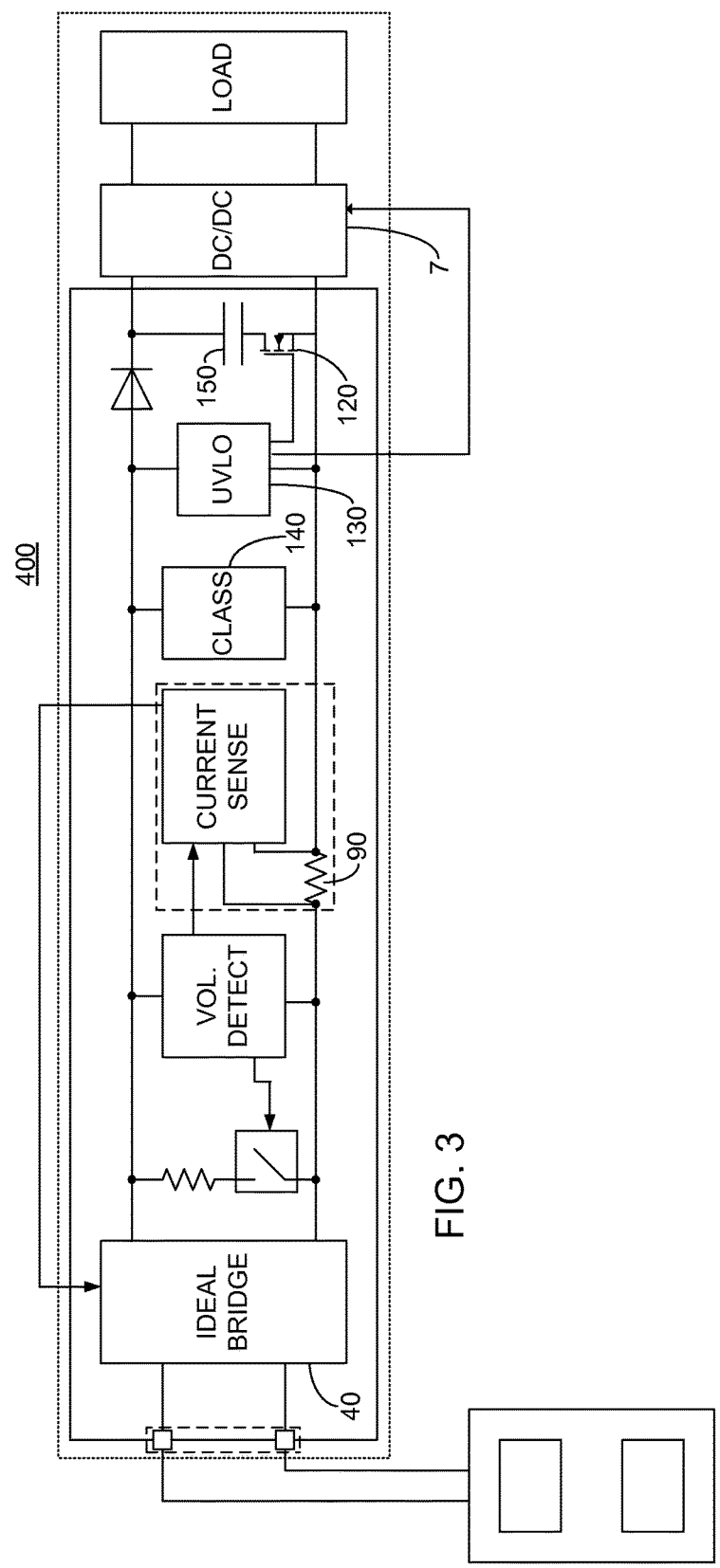
FIG. 3 illustrates a high level schematic diagram of a PoE system comprising a PSE and a PD, wherein an isolation switch of the PD is removed from the return current path, according to certain embodiments.

FIG. 3 illustrates a high level schematic diagram of a PoE system 400. PoE system 400 is in all respects similar to PoE system 1 of FIG. 1B, with the exception that isolation switch 120 is removed from the current return path, i.e. isolation switch 120 is coupled between input capacitance element 150 and the current path between the return output of DC/DC converter 7 and return RET of ideal diode bridge 40. In particular, the drain of isolation switch 120 is coupled to the second end of input capacitance element 150 and the source of isolation switch 120 is coupled to the return output of DC/DC converter 7, the output of optional class circuit 140, the second input of UVLO circuit 130, the first end of resistor 90 and the first input of current sense unit 100. A respective output of UVLO circuit 130 is in communication with a control input of DC/DC converter 7. The operation of PoE system 400 is in all respects similar to the operation of PoE system 1, except as described below, and in the interest of brevity will not be further described. Advantageously, current output from the return of DC/DC converter 7 towards ideal diode bridge 40 does not flow through isolation switch 120, thereby preventing unnecessary power loss therefrom. When UVLO circuit 130 opens isolation switch 120, UVLO circuit 130 is further preferably arranged to disable DC/DC converter 7 such that power does not flow therethrough and DC/DC converter 7 is enabled when isolation switch 120 is closed. The control of DC/DC converter 7 is illustrated as being responsive to UVLO circuit 130, however this is not meant to be limiting in any way, and a separate UVLO circuit may be supplied for DC/DC converter 7 without exceeding the scope. Alternately, DC/DC converter 7 may detect a lack of power draw by the load and disable itself.

Figure 4:
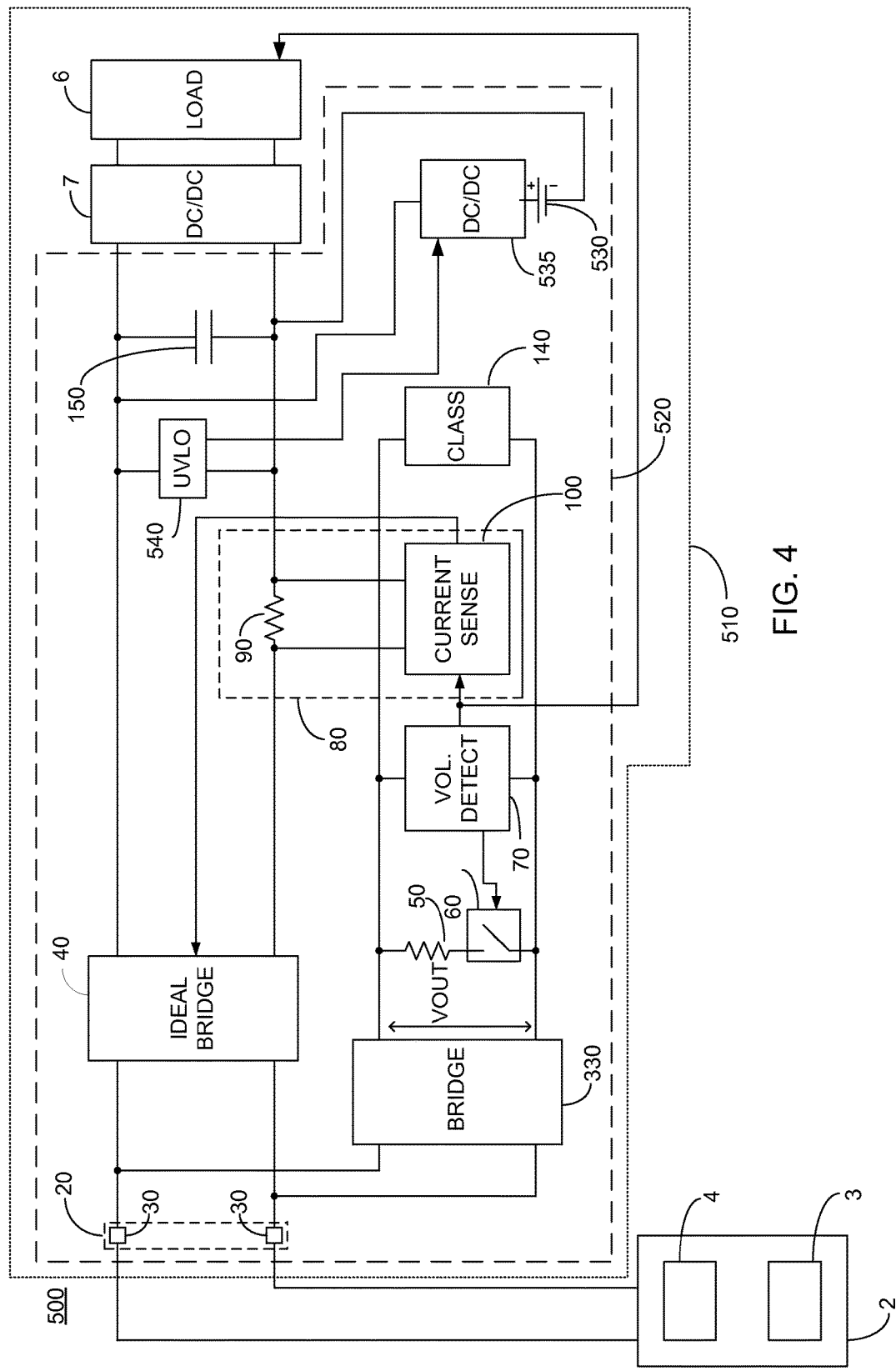
FIG. 4 illustrates a high level schematic diagram of a PoE system comprising a PSE and a PD, wherein the potential difference between an input capacitance element of the PD is maintained above a predetermined value, according to certain embodiments.

FIG. 4 illustrates a high level schematic diagram of a PoE system 500, comprising: a PSE 2 comprising an adjustable power source 3 and a PSE control circuitry 4; and a PD 510 comprising a load 6, a DC-DC converter 7 and a PD interface 520. PD interface 520 comprises: a power reception port 20, comprising a pair of port nodes 30; an ideal diode bridge 40; a signature resistive element 50; a resistance switch 60; a voltage detection circuitry 70; a current detection circuitry 80, comprising a resistor 90 and a current sense unit 100; an optional class circuit 140; an input capacitance element 150; a diode bridge 330; a power source 530; a DC/DC power converter 535; and a UVLO circuit 540. In one embodiment, power source 530 comprises a Lithium battery and optionally DC/DC power converter 535 comprises a boost converter.

Each input of ideal diode bridge 40 is coupled to a respective output of PSE 2 via a respective port node 30 of power reception port 20, as described above in relation to PoE system 1 of FIG. 1A. The output of ideal diode bridge 40 is coupled to a first input of UVLO circuit 540, an output of DC/DC power converter 535, a first end of input capacitance element 150 and a power input of DC/DC converter 7. A power output of DC/DC converter 7 is coupled to an input of load 6. The return of load 6 is coupled to a return input of DC/DC converter 7. A return output of DC/DC converter 7 is coupled to the second end of input capacitance element 150, the return of power source 530, a second input of UVLO circuit 540, a first end of resistor 90 and a first input of current sense unit 100 of current detection circuitry 80. A second end of resistor 90 is coupled to a second input of current sense unit 100 and the return of ideal diode bridge 40. The output of DC/DC power converter 535 is coupled to the power terminal of power source 530.

Each input of ideal diode bridge 40 is further coupled to a respective input of diode bridge 330. The positive output of diode bridge 330 is coupled to a first end of signature resistive element 50, a first input of voltage detection circuitry 70, and the input of optional class circuit 140. The output of optional class circuit 140 is coupled to a second input of voltage detection circuitry 70, a first terminal of resistance switch 60 and the return of diode bridge 330. The second terminal of resistance switch 60 is coupled to the second end of signature resistance element 50 and the control input of resistance switch 60 is in communication with a first output of voltage detection circuitry 70. A second output of voltage detection circuitry 70 is in electrical communication with an enabling input of current sense unit 100 and an enabling input of load 6.

The operation of PSE 2 is as described above in relation to FIG. 1C and in the interest of brevity will not be further described, only the operation of PD interface 510 being described in some detail. In operation, voltage detection circuitry 70 is arranged to detect the potential difference between the output and return of diode bridge 330, denoted VOUT, and enable/disable resistance switch 60, current sense unit 100 and load 6 responsive thereto. In particular, as described above, in the event that VOUT is less than a predetermined minimum detection stage voltage value, optionally 12V, voltage detection circuit 70 is arranged to close resistance switch 60, thus presenting signature resistive element 50 to PSE control circuitry 4 via diode bridge 330 for the signature detection of stages 1000-1020. When power is provided by PSE 2, in stage 1060 described above, voltage detection circuitry 70 is arranged to enable the operation of current sense unit 100 and load 6, responsive to voltage VOUT rising above a predetermined minimum operating voltage value, optionally 30-35V. current sense unit 100, upon sensing a flow of current above a predetermined level, and responsive to the voltage detected by voltage detection circuitry 70 enables operation of ideal diode bridge 40. The operation of current sense unit 100 and optional class circuit 140 are as described above in relation to FIGS. 1A-1C and in the interest of brevity will not be further described.

The combination of UVLO circuit 540, DC/DC power converter 535 and power supply 530 maintains the voltage of input capacitance element 150 to be above a predetermined power down voltage value, the predetermined power down voltage value being above the detection and/or classification voltage level, optionally 22V. In particular, UVLO circuit 540 is arranged to detect the potential difference across input capacitance element 150. In the event the potential difference across input capacitance element 150 drops below the predetermined power down voltage value, UVLO circuit 540 is arranged to enable DC/DC power converter 535 to charge input capacitance element 150 with power output by power supply 530. In absence of such an arrangement, input capacitance element 150 is typically isolated from ideal diode bridge 40 so as not to interfere during the detection stage and optional classification stage. Advantageously, since the voltage of input capacitance element 150 is being maintained above the detection and classification voltage levels, ideal diode bridge 40 prevents any voltage across input capacitance element 150 from appearing across the input to ideal diode bridge 40, and thus any voltage across input capacitance element 150 does not interference with detection or classification. An isolation switch, such as isolation switch 120 described above, is thus not required and unnecessary power loss across such an isolation switch is prevented.

Figure 5:
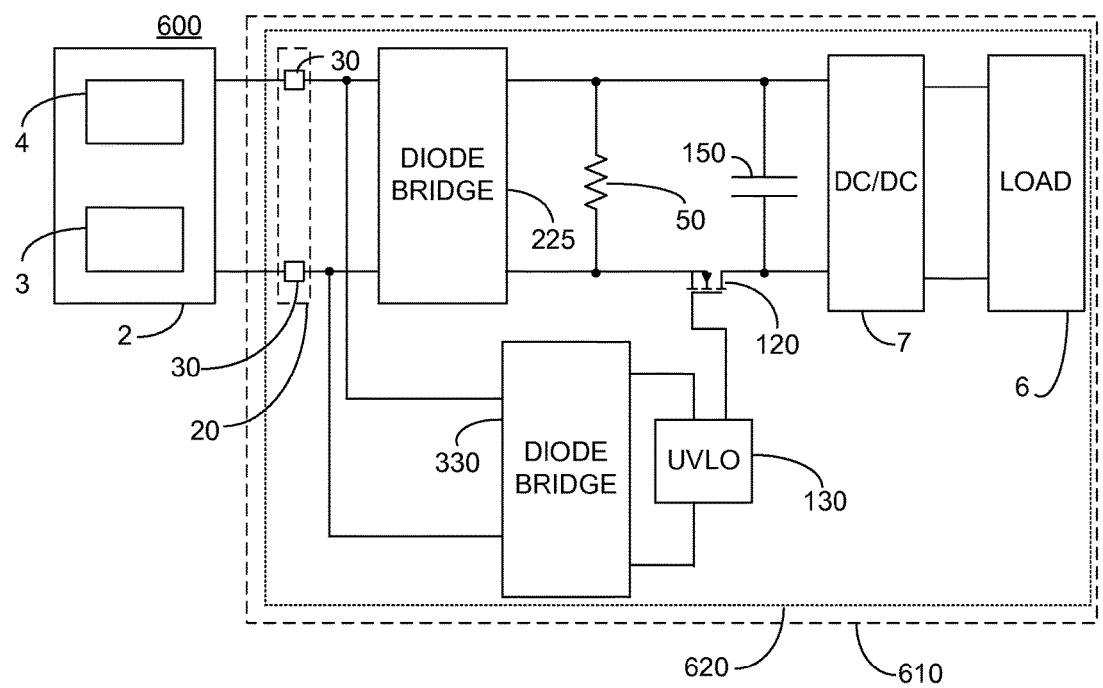
FIG. 5 illustrates a high level schematic diagram of a PoE system comprising a PSE and a PD, wherein an undervoltage lock-out (UVLO) circuit of the PD is isolated from an input capacitance element by the main diode bridge of the PD, according to certain embodiments.

FIG. 5 illustrates a high level schematic diagram of PoE system 600, comprising: a PSE 2 comprising a adjustable power source 3 and a PSE control circuitry 4; and a PD 610 comprising a load 6, a DC-DC converter 7 and a PD interface 620. PD interface 620 comprises: a power reception port 20, comprising a pair of port nodes 30; a signature resistive element 50; a diode bridge 225; an isolation switch 120; a UVLO circuit 130; an input capacitance element 150; and a diode bridge 330.

Each input of diode bridge 225 is coupled to a respective output of PSE 2 via a respective port node 30 of power reception port 20, as described above in relation to PoE system 1 of FIG. 1A. The output of diode bridge 225 is coupled to a first end of signature resistive element 50, a first end of input capacitance element 150 and to a power input of DC/DC converter 7. A power output of DC/DC converter 7 is coupled to an input of load 6. A return of load 6 is coupled to a return input of DC/DC converter 7 and a return output of DC/DC converter 7 is coupled to a second end of input capacitance element 150 and the drain of isolation switch 120. The source of isolation switch 120 is coupled to the second end of signature resistive element 50 and the return of diode bridge 225. Each input of diode bridge 225 is further coupled to a respective input of diode bridge 330. The output of diode bridge 330 is coupled to a first input of UVLO circuit 130 and the return of diode bridge 330 is coupled to a second input of UVLO circuit 130. An output of UVLO circuit 130 is coupled to the gate of isolation switch 120.

In operation, PSE 2 operates in all respects as described above in relation to FIG. 1C. In particular, as described above in relation to stage 1010, PSE control circuitry 4 is arranged to detect the resistance of signature resistive element 50. UVLO circuit 130 is arranged to open isolation switch 120 responsive to the potential difference between the output and the return of diode bridge 330 being less than the predetermined minimum operating voltage, as described above. Thus, signature resistive element 50 is isolated from input capacitance element 150 responsive to the opening of isolation switch 120.

Advantageously, the embodiments depicted herein provide an almost 100% power availability for load 6, while still maintaining the key features of the above mentioned standards. In particular the shortened power down period responsive to an MPS detection, followed by a potentially valid load detection, as described in stages 1080-1090 of FIG. 1E, provides for almost full time power availability for the load. Thus, in the event that load 6 is constituted of a light, such as an LED strip, turn on of the switch is responded to by the PoE system described herein without perceptible delay.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

The terms "include", "comprise" and "have" and their conjugates as used herein mean "including but not necessarily limited to".

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. A rapid start-up power over Ethernet (PoE) system arranged to supply power to a remotely located powered device (PD), the rapid start-up PoE system comprising:
    a power sourcing equipment (PSE); and
    the PD,
    wherein said PD comprises:
        a PD interface comprising a signature resistive element;
        a power converter; and
        a load in electrical communication with a power output of said power converter,
    wherein said PSE comprises:
        a PSE control circuitry; and
        a power source in electrical communication with said PD and responsive to said PSE control circuitry, said PSE control circuitry arranged to:

control said power source to output a detection signal exhibiting a first predetermined voltage range;

responsive to said output detection signal, determine the resistance of said signature resistive element;

in the event that said determined resistance of said signature resistive element is within a predetermined range, control said power source to output power to said load, said output power exhibiting a second predetermined voltage range, greater than said first predetermined voltage range;

in the event that said determined resistance of said signature resistive element is outside said predetermined range, prevent said power source from outputting power for a predetermined disconnect time period;

monitor the amount of power drawn from said power source;

in the event that the amount of said monitored power is less than a predetermined minimum power draw value, control said power source to cease output of power for a predetermined power down time period, said predetermined power down time period less than said predetermined disconnect time period; and immediately subsequent to said predetermined power down time period, control said power source to output said detection signal.

2. The rapid start-up power over Ethernet (PoE) system of claim 1, wherein said PSE control circuitry is further arranged to:

control said power source to again output power to said load, responsive to said immediately subsequent output detection signal.

3. The PoE system of claim 1, wherein said predetermined power down time period is less than $\frac{1}{10}$ said predetermined disconnect period.

4. The PoE system of claim 1, wherein said PD interface further comprises:

a power reception port comprising a plurality of port nodes, each of said plurality of port nodes in electrical communication with said power source via a respective one of the plurality of data wire pairs;

a first diode bridge, each input of said first diode bridge in electrical communication with a respective port node of said power reception port, and an output of said first diode bridge in electrical communication with an input of said power converter, said power converter arranged to receive power from said power source via said first diode bridge; and an input capacitance element, a first end of said input capacitance element in electrical communication with the electrical power path of said first diode bridge and said power converter, said power received by said power converter responsive to said input capacitance element, wherein said signature resistive element is electrically isolated from said input capacitance element by said first diode bridge.

5. The PoE system of claim 4, wherein said PD interface further comprises a second diode bridge, different than said first diode bridge, each input of said second diode bridge in electrical communication with a respective port node of said power reception port, and wherein said electrical communication between said signature resistive element and said PSE control circuitry is via said second diode bridge.

6. The PD interface of claim 1, further comprising:

an electronically controlled switch in electrical communication with said input capacitance element, said electrical communication of said input capacitance element with the electrical power path of said first diode bridge and said power converter responsive to said electronically controlled switch; and a switch control in electrical communication with said electronically controlled switch and with said power reception port, said switch control arranged to alternately open and close said electronically controlled switch responsive to the voltage value at said power reception port, wherein said switch control is electrically isolated from said input capacitance element by said first diode bridge.

7. A power sourcing equipment (PSE) for providing power over a plurality of data wire pairs, the PSE comprising:

a power source arranged to provide power over the plurality of data wire pairs; and a control circuitry in communication with said power source, wherein said PSE control circuitry is arranged to:

control said power source to output a detection signal exhibiting a first predetermined voltage range;

responsive to said output detection signal, determine the resistance at the output of said power source;

in the event that said determined resistance is within a predetermined range, control said power source to output power to the plurality of data wire pairs, said output power exhibiting a second predetermined voltage range, greater than said first predetermined voltage range;

in the event that said determined resistance is outside said predetermined range, prevent said power source from outputting power for a predetermined disconnect time period;

monitor the amount of power drawn from said power source;

in the event that the amount of said monitored power is less than a predetermined minimum power draw value, control said power source to cease output of power for a predetermined power down time period, said predetermined power down time period less than said predetermined disconnect time period;

immediately subsequent to said predetermined power down time period, control said power source to output said detection signal.

8. The PSE of claim 7, wherein said PSE control circuitry is further arranged to:

control said power source to again output power to said load, responsive to said immediately subsequent output detection signal.

9. The PSE of claim 7, wherein said predetermined power down time period is less than $\frac{1}{10}$ said predetermined disconnect period.

10. A rapid start-up power over Ethernet (PoE) method comprising:

outputting a detection signal exhibiting a first predetermined voltage range;

responsive to said output detection signal, determining the resistance of a signature resistive element of a powered device (PD) in electrical communication with the plurality of data wire pairs;

in the event that said determined resistance of the signature resistive element is within a predetermined range, outputting power exhibiting a second predetermined voltage range, greater than said first predetermined voltage range;

in the event that said determined resistance of the signature resistive element is outside said predetermined range, outputting said detection signal immediately subsequent to a predetermined disconnect time period;

monitoring the amount of power drawn from a power source;

in the event that that the amount of said monitored power is less than a predetermined minimum power draw value, outputting said detection signal immediately subsequent to a predetermined power down time period, said predetermined power down time period less than said predetermined disconnect time period.

11. The method of claim 10, wherein said predetermined power down time period is less than 1/10 said predetermined disconnect period.

12. The method of claim 10, further comprising:
providing said output power to a power converter, via a first diode bridge, said power providing responsive to an input capacitance element in electrical communication with an electrical power path of the first diode bridge and the power converter; and
isolating the signature resistive element from the input capacitance element via the first diode bridge.

13. The method of claim 12, wherein the signature resistive element comprises:
a first signature resistive portion; and
a second signature resistive portion, and wherein responsive to said output detection signal exhibiting a first polarity, the method further comprises:
providing said output detection signal to the first signature resistive portion; and
isolating the second signature resistive portion from said first polarity power, and
wherein responsive to said output detection signal exhibiting a second polarity, opposing said first polarity, the method further comprises:
providing said output detection signal to the second signature resistive portion; and
isolating the first signature resistive portion from said first polarity power.

14. The method of claim 12, further comprising providing said output detection signal to the signature resistive element via a second diode bridge, different than the first diode bridge.

15. The method of claim 10, further comprising:
providing said output power to a power converter, via a first diode bridge, said power providing responsive to an input capacitance element in electrical communication with an electrical power path of the first diode bridge and the power converter;
responsive to a switch control, alternately opening and closing an electronically controlled switch in electrical communication with the input capacitance element, the electrical communication of the input capacitance element with the electrical power path of the first diode bridge and the power converter responsive to said opening and closing; and
isolating the switch control from the input capacitance element via the first diode bridge.

* * * * *